United States Patent
Bernstein et al.

[11] 3,902,308
[45] Sept. 2, 1975

[54] OPTICAL SENSING SYSTEM FOR TEXTILE APPARATUS

[75] Inventors: Barry Evans Bernstein, Warwick; Robert Stephen Erbstein, Coventry, both of R.I.

[73] Assignee: Leesona Corporation, Warwick, R.I.

[22] Filed: Sept. 19, 1973

[21] Appl. No.: 398,589

[52] U.S. Cl. .................... 57/34 R; 57/53; 356/172
[51] Int. Cl.² .................... D01H 13/00; D01H 9/10
[58] Field of Search... 57/34 R, 53; 250/216, 222 R, 250/223 R; 356/155, 172

[56] References Cited
UNITED STATES PATENTS

| | | | |
|---|---|---|---|
| 3,333,504 | 8/1967 | Jones et al. | 356/172 |
| 3,612,881 | 10/1971 | King | 356/172 X |
| 3,789,595 | 2/1974 | Bernstein et al. | 57/34 R |

Primary Examiner—John W. Huckert
Assistant Examiner—Charles Gorenstein
Attorney, Agent, or Firm—Albert P. Davis; Burnett W. Norton

[57] ABSTRACT

In an automatic spinning machine equipped with a traveling tender carriage capable of detecting the existence of an abnormal condition at a station on the machine and servicing the station to restore it to normal operation, an optical sensing system is associated with the carriage to optically sense the movement of the carriage into registration with a spinning station and provide an indication thereof by reflection from a curved specular surface situated at the station. Preferably the sensing system includes a plurality of sensing stages, the outputs of which are used to control the arrest of the carriage and its alignment with a station to be serviced according to a predetermined sequence. In a preferred embodiment, a pair of photodector cells is employed in each sensing stage and the signals generated thereby are compared electronically to detect when the cell pair is disposed symmetrically of the center line of the given station.

7 Claims, 16 Drawing Figures

OPTICAL SENSING SYSTEM FOR TEXTILE APPARATUS

This invention relates to automatic multi-station spinning machines, i.e., spinning machines equipped with an automatically functioning tending or servicing carriage traveling along the sides of the machine and capable of detecting the existence at a spinning station along the machine of an "abnormal" condition requiring servicing and of carrying out the necessary operations to restore that position to normal functioning, and is concerned more particularly with an optical system for detecting or sensing the arrival of the tending or servicing carriage in registration with one or more of the several stations situated along the length of the spinning machines, as well as a carriage control using the indication of that system, and for effectively positioning the carriage in functional alignment with a given station to be serviced.

Traditionally, ring spinning machines or frames have been tended by manual labor in which a human operator observes a given number of spinning positions, determines when an "abnormal" condition occurs at a given position, e.g., when a bobbin has been fully wound or the flow of the yarn interrupted, removes the partially or fully wound bobbin if need be, and re-unites a broken yarn or threads up the roving onto a fresh empty bobbin in order to restore that position to normal working operation. Needless to say, the cost of manual labor for this purpose is considerable and in recent times textile equipment manufacturers have concentrated heavily on developing equipment that will perform in essentially an automatic fashion the manipulative operations required for servicing such spinning machines. Examples of patents covering such equipment developed by the assignee of the present application and of interest in relation to the present invention include U.S. Pat. Nos. 3,403,866, 3,688,486, 3,724,192 and 3,735,576. Generally similar equipment developed by other companies are disclosed in U.S. Pat. Nos. 3,486,319, 3,540,200 and 3,740,937.

While the equipment disclosed in the above identified patents vary in the details of their design and operation, they are all similar in basic concept and contemplate the association with the ring spinning frame of a servicing carriage or tender which patrols either back and forth or around the rows of spinning stations on each side of the frame while riding on a track affixed to the frame for this purpose. The servicing carriage is equipped with sensing devices for detecting the occurrence at any spinning position of an abnormal condition calling for servicing by the tender. Typically, such abnormal conditions include the completion of a fully wound bobbin or an interruption or rupture in the flow of the yarn to the bobbin at a given spinning station. In the first of these conditions, the tender functions to doff the fully wound bobbin from the spindle at that station, don an empty bobbin on that spindle, and then initiate the winding of the yarn on the newly donned bobbin. In the second case, a trailing end may be unwound from the partially wound bobbin and reunited with the spun yarn or, alternatively, the partially filled bobbin can be doffed, a fresh bobbin donned and winding of the spun yarn initiated on the new bobbin as in the first case. After the servicing function is completed and the tender confirms that the station being serviced is restored to normal functioning condition, the tender returns to its patrolling action along the spindle rows until another station is detected which requires servicing.

In order for the equipment carried by the tender carriage to perform the manipulative functions involved in carrying out the servicing operations just described, it is important that the tender carriage be positioned in transverse alignment with the spinning station to be serviced within rather precise tolerances. In particular, the threading of the spun yarn through the traveler of the spinning ring is a critical step and the mechanism employed for accomplishing this step must be carefully oriented with respect to the spinning station. Such orientation can be accomplished mechanically, as is the case in the system disclosed in U.S. Pat. No. 3,493,866 in which a positioning slot is provided on the spinning frame for each of the spinning stations thereon and mechanical means, such as a wedge device, is provided on the tender carriage to make direct mechanical engagement with the alignment slot. The use of a mechanical connection, however, is subject to important disadvantages in the context of the system under consideration in that virtually any mechanical device suitable for the intended purpose will subject the travelling unit to considerable shock during stoppage which can disturb or harm sensitive electronic control equipment often carried on the tender carriage and can even lead to breakage of mechanical components. Also, mechanical stopping devices tend to have considerable inertia and, consequently, can add significantly to the length of time required for the carriage to be brought to an effective halt and returned to its patrolling action.

An important object of the present invention is, therefore, the provision on an automatic tending unit of the type described in the above-identified patents of an optical detecting or sensing system in which the arrival of the carriage into registration with a spinning station of the spinning machine is determined by optical means requiring no physical contact whatever with the mechanical components of the spinning machine. The system is preferably used for actual control of the tender carriage to arrest its movement in proper functional relationship with the spinning station, but it can also be employed for other purposes, such as to initiate control signals coincidentally with the movement of the patrolling carriage past registration with the spinning stations spaced along the respective sides of the frame, such control signal serving to initiate a series of inspection operations evaluating the condition of the spinning operation at each station to determine if an abnormal condition has occurred which requires the attention of the tender. A further purpose is to locate the carriage with respect to the spinning frame by counting spindles from a preestablished reference point. In a preferred embodiment of the invention, the optical sensing system of the invention includes a plurality of optical detecting or sensing stages which are adapted to arrest the movement of the carriage and achieve its registration in proper functional alignment with the spinning station in accordance with a predetermined programmed sequence of steps.

These and other objects will be more fully understood from the following detailed description when read in conjunction with the accompanying drawings in which.

Figure 1:
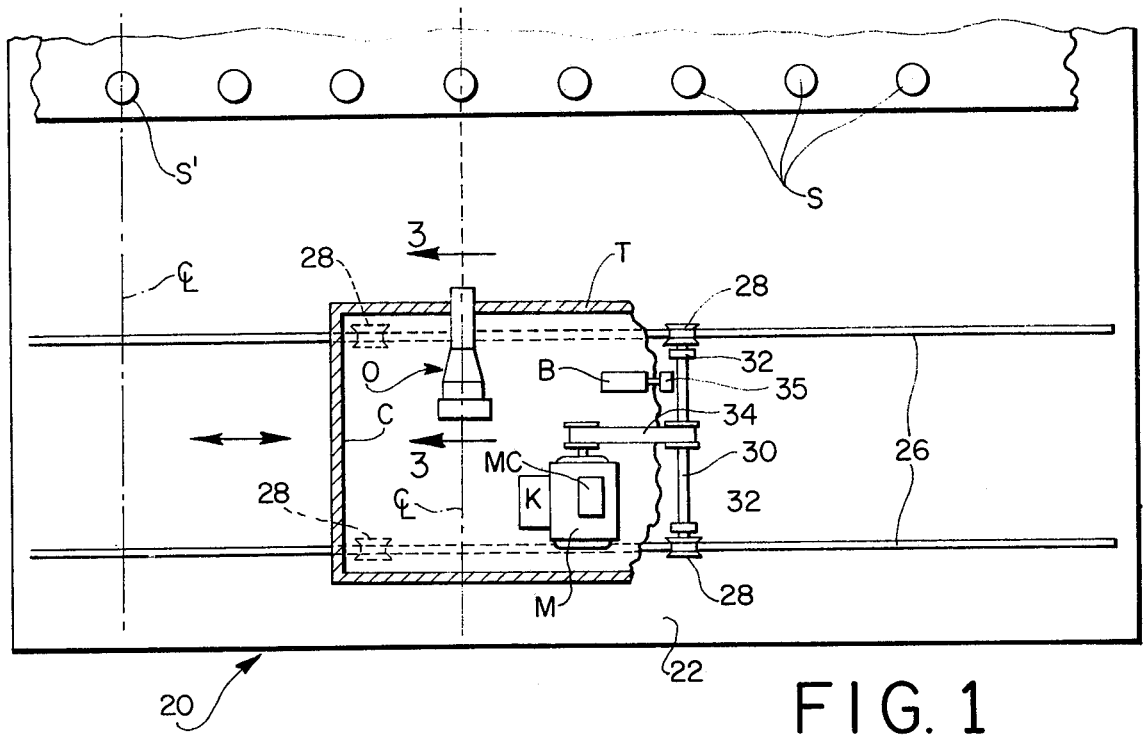
FIG. 1 is a fragmentary, schematic plan view of a spinning machine associated with a travelling servicing carriage embodying one embodiment of an optical sensing system according to the present invention.

FIG. 1 illustrates in highly schematic and fragmentary fashion the minimum components of a textile spinning frame designated generally by the numeral 20, which components include a base 22 supporting a spindle rail 37 on which a series of spindles S are suitably journalled for independent rotation, each such spindle S representing a single spinning station on the frame. Since only the base portions of the spindles S are significant for present purposes, the remainder of the spindle is omitted in FIG. 1, but it will be understood that each such spindle is adapted to removably support a bobbin core in telescoping relation thereon to receive a strand of yarn wound into a yarn package. Each such spindle station S can be visualized as having a "center line" defined by a vertical plane passed through the spindle axis in transverse relation to the line of the series of spindles S, several such center lines being represented by dot-dash lines in FIG. 1 and designated C/L.

In order to perform the servicing operations contemplated by the above-identified commonly assigned US patents and more fully described in the specifications thereof, which descriptions are expressly incorporated by reference into this disclosure, a tender carriage T is provided to patrol along the row of spindles S, the carriage being represented here merely by a carriage housing C. It is immaterial for purposes of the present improvement whether the tender carriage is supported on tracks disposed along the lower front of the spinning frame or, alternatively, on tracks raised above the spinning frame, the first such approach being embodied, for example, in U.S. Pat. No. 3,403,866 and the second in U.S. Pat. No. 3,724,192, and either approach would serve equally well for purposes of the invention. Choosing the first such approach for illustration here, the tracks are represented as taking the form of two spaced parallel rails 26 disposed beneath the tender carriage C on the spinning frame base 22 for rolling engagement with a set of wheels 28 which are suitably journalled on the underside of carriage housing C. That housing is cut away at the right in FIG. 1 to show the pair of such wheels at the right end of the carriage housing C fixedly mounted on a common shaft 30 supported in journals 32 dependent from the underside of housing C.

To supply motive power for the patrolling movement of the tender T, drive means are provided for the carriage which in FIG. 1 are represented by a motor M carried on the carriage housing with the motor shaft connected via a timing belt 34 to a drive pulley fixed on shaft 30. A tachometer K is associated with motor M to provide an indication of the speed of the motor which can serve a control function as will be described later. To assist in arresting the motion of the tender carriage C when motor M has been deenergized, a carriage brake B is also mounted on the carriage housing which includes a brake shoe 35 adapted to be projected into braking engagement with shaft 30 by any suitable actuating means, such as a solenoid or the like, forming part of brake B. On the inside of the carriage housing facing the spindle row is an optical sensing unit O which in the illustrated form is a combined optical projector/receptor "gun" arranged with its axis in parallel relation to the center lines of the spinning positions S, projecting at its interior end through the inside wall of carriage C so as to have a "sight" scanning a portion of each of the spindles S as the tender T patrols along the tracks 26.

Figure 2:
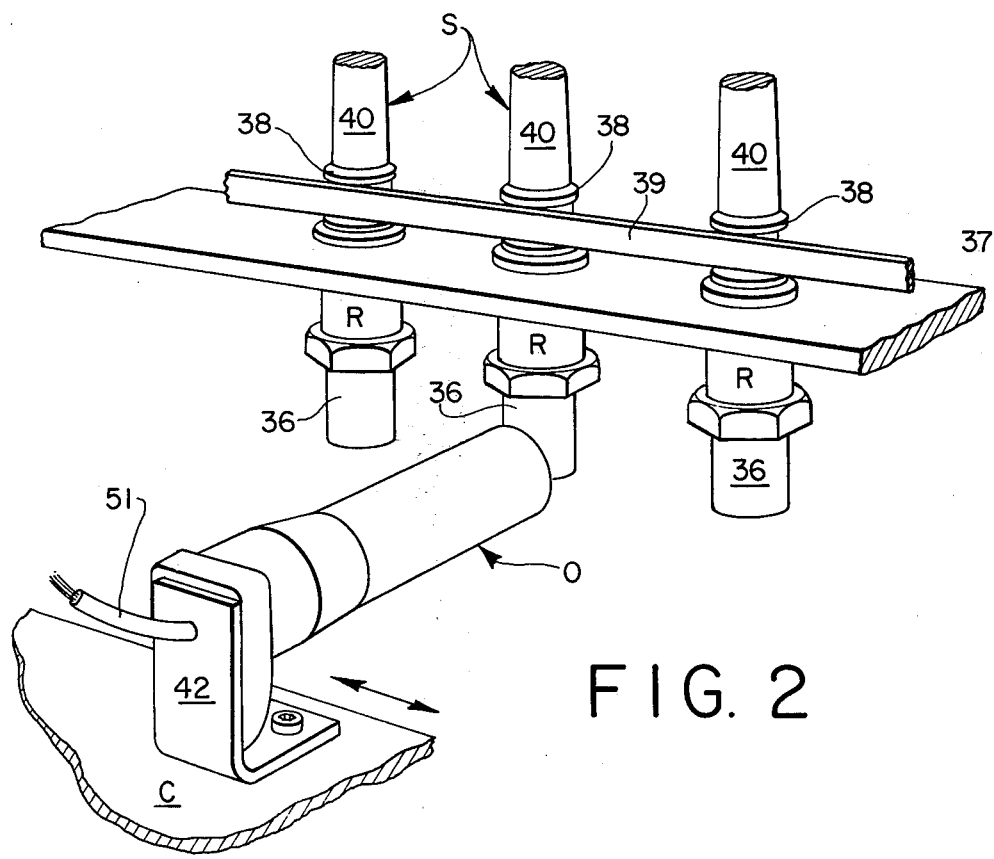
FIG. 2 is a diagrammatic perspective view of a fragment of the machine of FIG. 1 showing the optical sensing unit, detached from the remainder of the carriage for sake of clarity, in operative relationship to the spindles of several spinning stations.

The spatial relationship of the optical sensing unit O to spindles S is perhaps more readily visualized from the perspective of FIG. 2. Here can be seen the row of spindles S, each of which includes a stationary supporting post 36 fixed to a common spindle rail 37 and upper rotatable sections 40 which are journalled on the fixed post 36 for rotation by means of a driving belt 39 in frictional engagement with an intermediate whorl section 38. In accordance with the invention, the otherwise conventional structure of the spindle stations S is modified to include a curved specular reflecting or mirror surface R which in the embodiment of FIG. 2 can take the form of a short length of a polished cylindrical collar affixed on each spindle post 36 below the plane of spindle rail 37. The optical sensing unit O is mounted on the floor of the carriage housing C by means of an upstanding bracket 42 in a proper vertical alignment with the specular reflecting surfaces R.

Figure 3:
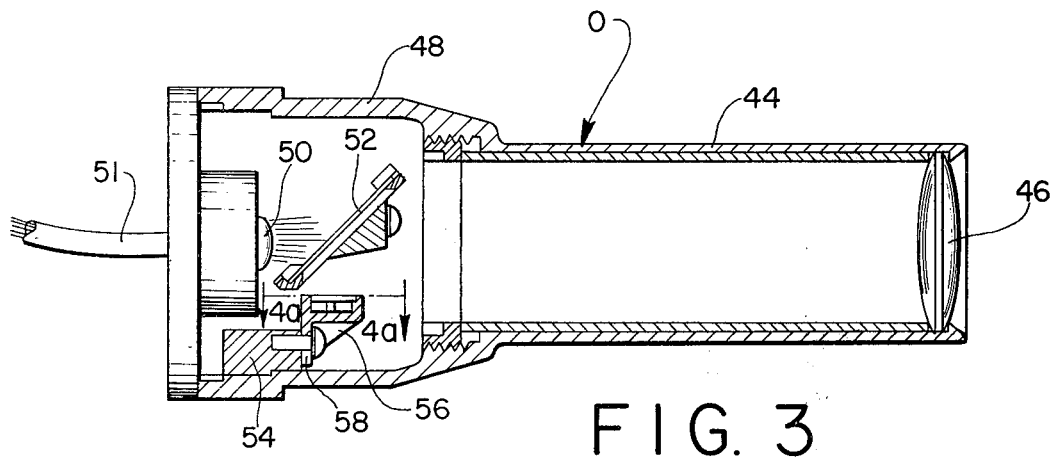
FIG. 3 is a cross-sectional side view taken through the optical sensing unit along lines 3—3 of FIG. 1.

The details of the combined optical projector/receptor "gun" O are best seen by reference to FIG. 3 and it will be seen that the "gun" O includes an inwardly directed tubular section 44 supporting at its innermost end a lens 46 and an outer housing section 48. Within the latter in spaced axial alignment to tube 44 and lens 46 is a light source 50 energized through an electrical lead 51, which source is effective to transmit a reasonably high intensity beam of light through a light-splitting mirror 52 of a type well known in the field of optics as a "beam splitter." As shown in FIG. 3, mirror 52 is arranged at an inclined angle to the axis of light source 50 and is adapted to transmit light therethrough in the direction of lens 46 and on receiving radiation reflected in the opposite direction through lens 46 to reflect a measurable proportion of that radiation in a direction transverse to the unit axis, in this case downwardly. Situated within the housing section 48 generally below the light-splitting mirror 52 is a supporting block 54 which serves to removably support an array of photocells P formed integrally with a supporting bracket 56. The bracket 56 includes a vertically extending lip 58 which carries a spaced pair of horizontally extending pins 60 which are adapted for frictional engagement with mating sockets provided in mounting block 54. At its upper end, bracket 56 is formed with a flat recess in which the array of photocells P is adapted to be embedded.

Figure 4A:
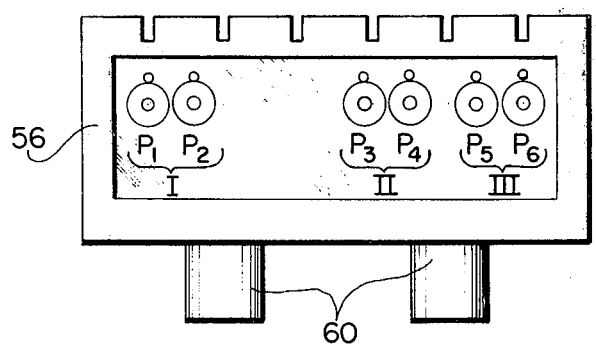
FIG. 4A is a detail view greatly enlarged of one array of photocells useful in the optical sensing unit of FIG. 3.
Figure 4B:
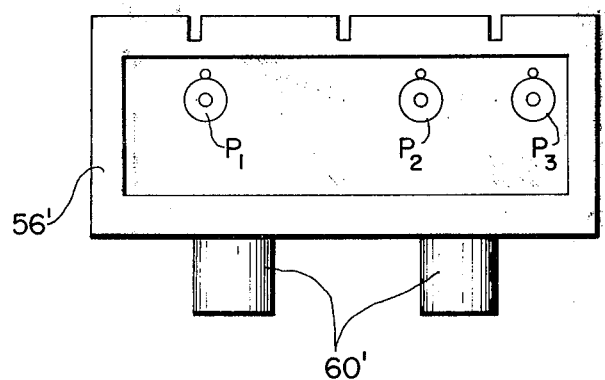
FIG. 4B is an alternative embodiment of a different array of photocell units otherwise similar to FIG. 4A.

The number of photocells in the array P is subject to variation within the scope of the invention and two embodiments are depicted in greatly enlarged fashion in FIGS. 4A and 4B. According to the preferred embodiment shown in FIG. 4A, there are six photocells $P_1$-$P_6$ which are associated in pairs, each pair constituting a separate sensing stage as will be described later. Thus, stage I includes cells $P_1$ and $P_2$, stage 11, cells $P_3$ and $P_4$ and stage III, cells $P_5$ and $P_6$. In the modified embodiment of FIG. 4B, the cells function singly and a total of three cells $P'_1$, $P'_2$ and $P'_3$ would thus be utilized, each serving as a single sensing stage. In either case, the cells P are arranged in a row parallel to the plane of light-splitting mirror 52. That is to say, a plane passing through the row of cells will intersect the plane of mirror 52 in a line parallel to the cell row. An alternate version of the preferred embodiment shown in FIG. 4A is to use five photocells, arranged such that cell $P_3$ is eliminated, and further, cells $P_4$ and $P_5$ comprise stage II, cells $P_5$ and $P_6$ comprise stage III. Thus, cell $P_5$ is common to stages II and III, reducing the size and complexity of photocell array P.

The transmittal of light from the several photodetectors P can be accomplished in several ways, all within the skill of the art. Thus, the photodetectors P could each be constituted directly by a phototransducer electrically connected to an appropriate electrical circuit as will be described later or, alternatively, the photodetectors P could be constituted by the ends of fiber optics for receiving light reflected from mirror 52 and transmitting the same to the phototransducers at some remote location. The details of either of these approaches are not material to the present invention and have not been illustrated.

It has been discovered quite surprisingly that if there is impringed upon a curved specular surface, such as that designated R above, a light beam of sufficient angular extent to illuminate a broad arc of such surface, preferably substantially the entirety of a 180° arc, and, if an array of spaced apart photodetectors is moved bodily in unison with the light source relative to the fixed specular surface, a reflected beam of light can be derived from the specular surface which can be focused into a narrow slit sufficiently thin as to irradiate each photodetector selectively and such spot will shift in scanning relation along the array of photodetectors during the relative movement. More importantly from the standpoint of the invention, the intensity of the light received by each of the photodetectors in such array has been quite unexpectedly found to follow a highly uniform pattern, notwithstanding the displacement of certain photodetectors away from the center line of the specular surface because of the relative motion thereof. Considering the normal laws of light reflection, one would expect that if a light beam were impinged upon a curved specular surface, the intensity of the reflected beam of light derived from such surface would achieve a maximum at the very center of the surface and that as the light source was displaced transversely away from the central axis of the specular surface, the intensity of the reflected beam of radiation would decrease or decay at a rapid rate, and this does occur. However, it would not have been expected that this effect would be virtually constant when the reflected beam was displaced angularly from the axis of the system. It has been established, however, that when the entirety of the specular surface, or at least a major portion of its arc, is more or less equally illuminated, the photodetecting means receiving the reflected beam can be displaced to a significant distance away from the center line of the specular surface without causing any significant change in the intensity and pattern of the reflected beam received by the photocells.

Figure 5A:
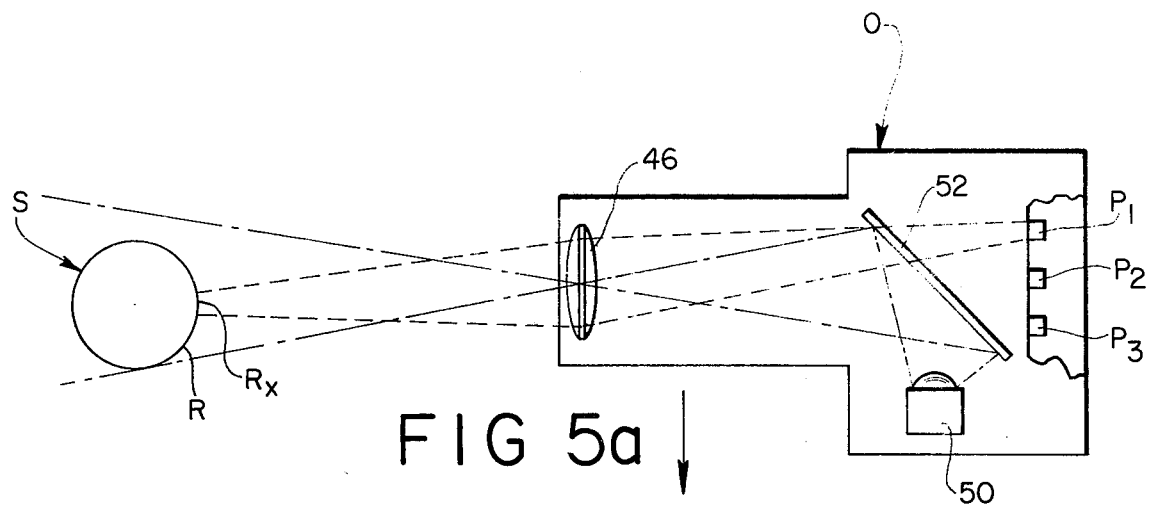
FIGS. 5A, 5B and 5C are simplified diagrammatic views, each looking down on the arrangement of FIG. 2, showing the spacial relationship of the optical sensing unit with a single spindle position in three sequential operative positions.
Figure 5B:
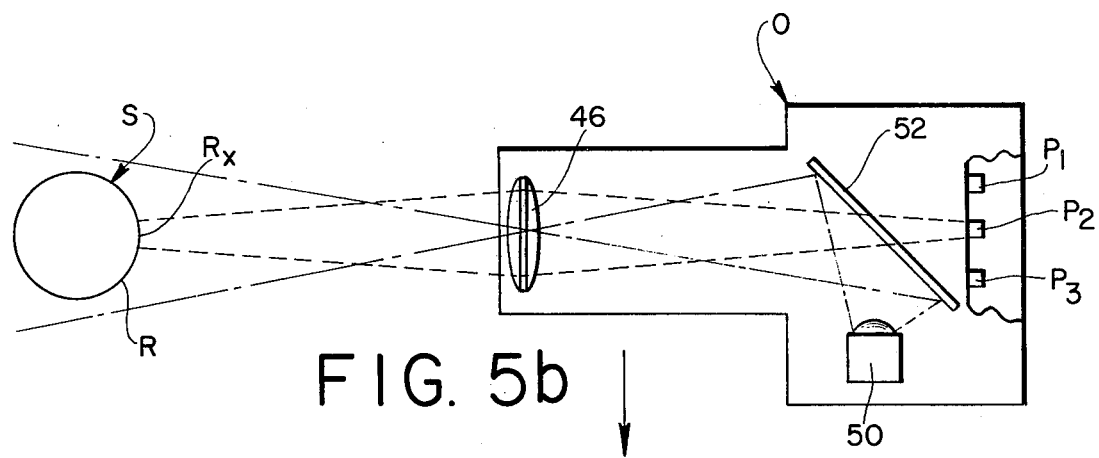

The just-described phenomenon was entirely unexpected. In order to illustrate this phenomenon, the operation of the optical sensing unit of the invention is shown schematically in three sequential steps in FIGS. 5A, 5B and 5C. To simplify the illustration, the relative positions of light source 50 and the array of photodetectors P has been reversed so that the photocell array is disposed generally on the axis of lens 46 and light source 50 displaced laterally to one side, but the principle of operation will be the same in either event. Only three cells are shown for purposes of illustration and the size of the cells has been considerably enlarged for clarity. In FIG. 5A, unit O is approaching the axis of curved specular surface R but is still spaced a short distance from that axis as the dot-dash center line of unit O indicates. The projected light beam is represented by dash-double dot lines and the width of the beam is sufficient to illuminate the entirely of specular surface R. Only a limited segment of the specular surface R, designated $R_r$, is effective to reflect radiation backwardly within the limits of lens 46 and that lens will be effective to focus the reflected beam to a small vertical slit which in the position shown in FIG. 5A impinges on the first of the light detectors $P_1$ in the array thereof. In FIG. 5B, the axis of the optical unit O now precisely coincides with the axis of the specular surface R due to the advance of the unit. The reflected light beam is derived from the same limited segment $R_r$ as before and is focused by lens 46 to a slit as before which now impinges on the centrally located photodetector $P_2$. Unit O then advances past the axis of specular surface R and the reflected light beam from segment $R_r$ surface impinges now on photodetector $P_3$ as in FIG. 5C.

Figure 5C:
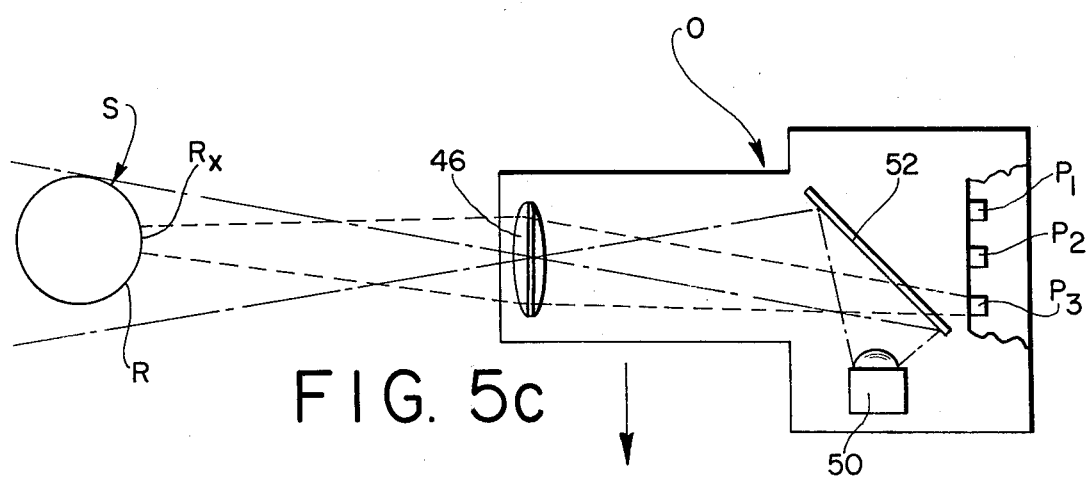
Figure 8:
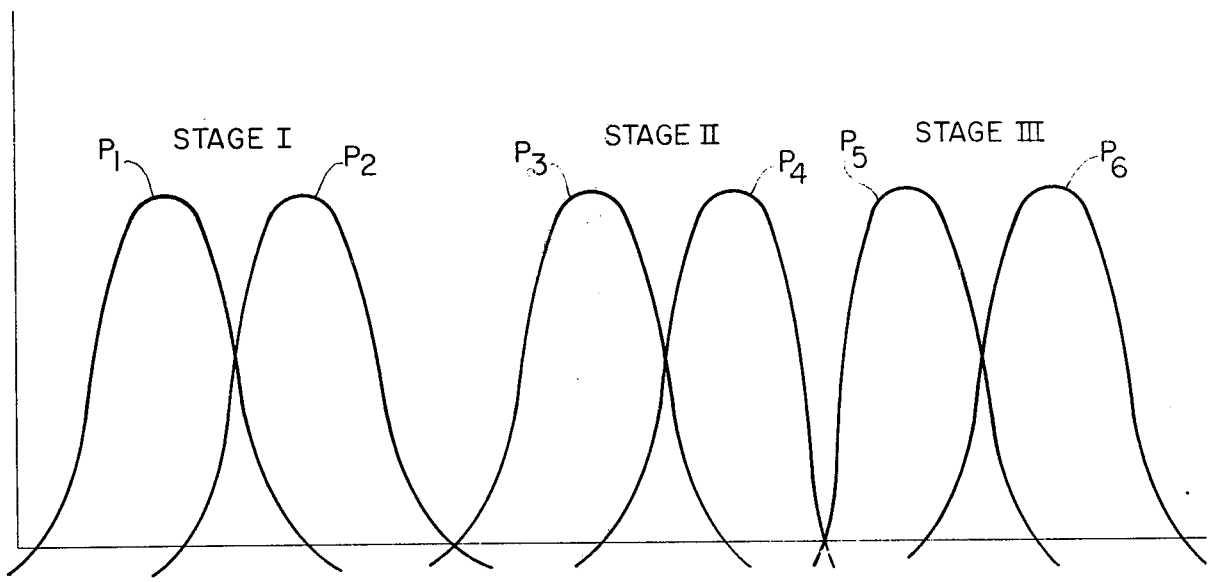
FIG. 8 is a graphic reproduction of actual amplified voltage output curves generated by the photodetectors of one embodiment of the invention similar to that of FIGS. 4A and 6, showing the surprising uniformity of such curves as well as their spacial relationship.

It has been determined that, in contrast to what would be expected as already mentioned, the reflected light beam is derived from the same segmental arc $R_r$ of the specular surface in each of the sequential steps illustrated in FIGS. 5A, 5B and 5C and, more importantly, that the intensity of the light slit scanning each of the photodetectors $P_1$, $P_2$ and $P_3$ is virtually precisely uniform. This result is demonstrated by FIG. 8 in which is plotted the actual response curves for an array of six photodetectors (as in the preferred embodiment of FIG. 4A). The uniformity in both the curvature and peak intensity of these several curves is noteworthy and, because of such uniformity, the light signals generated by the respective photodetectors in the array can be interpreted electronically to give a precisely reproducible indication of the relative position in relation to the axis of the specular surface R and thus to station S of the optical unit O, and thus of the travelling carriage C. By arranging the several photodetectors of the array in a known spaced relationship across, i.e., perpendicular, the axis of the optical unit O, it becomes possible to determine when the center axis of the optical unit has arrived in precise registration with the axis of the specular surface R and hence of the spinning station, and, moreover, to determine within fixed limits the existence of a relative displacement between such axes. Thus, one is able both to anticipate the arrival of the unit at the center line of the spinning position and then to gauge if the carriage unit when finally arrested is, in fact, oriented with respect to the center line of the spinning position within acceptable limits.

In accordance with the preferred embodiment of the invention, the photocells which are energized by the reflection from the curved specular surface at each spindle position during the movement of the carriage past such position are associated in paired relation and the responses of the cells in each respective pair are electronically compared in a particular way to provide an indication denoting the occurrence of a condition of registration (which can be transitory, i.e., while the carriage is in transit, as well as stationary, i.e., when the carriage motion is arrested). Reference has been already made to the fact that, as visually depicted in FIG. 8, the response of each cell in moving to and past the center line of a given spinning station takes the form of a peak and this peak will have a rather sharply defined nature when the curved specular reflecting surface has a relatively small radius compared to the distance between the photocell array and the spindle axis, some variation in the width of the peak being, of course, possibly by adjustment in the reflecting surface radius. In the preferred embodiment, the cells of an associated pair are spaced sufficiently close together that the adjacent sides of their respective curves will overlap and intersect at some intermediate point along their height in more or less X-shaped fashion. In this embodiment, this intersection point gives a point of reference which can be correlated to the precise center line of the spinning position being observed by the pair of cells by reason of the fact that the cells have a fixed known position relative to the optical axis of the unit and generate response curves of highly uniform curvature which thus extend symmetrically with respect to a line extending through their intersection point parallel to the optical axis.

Figure 6:
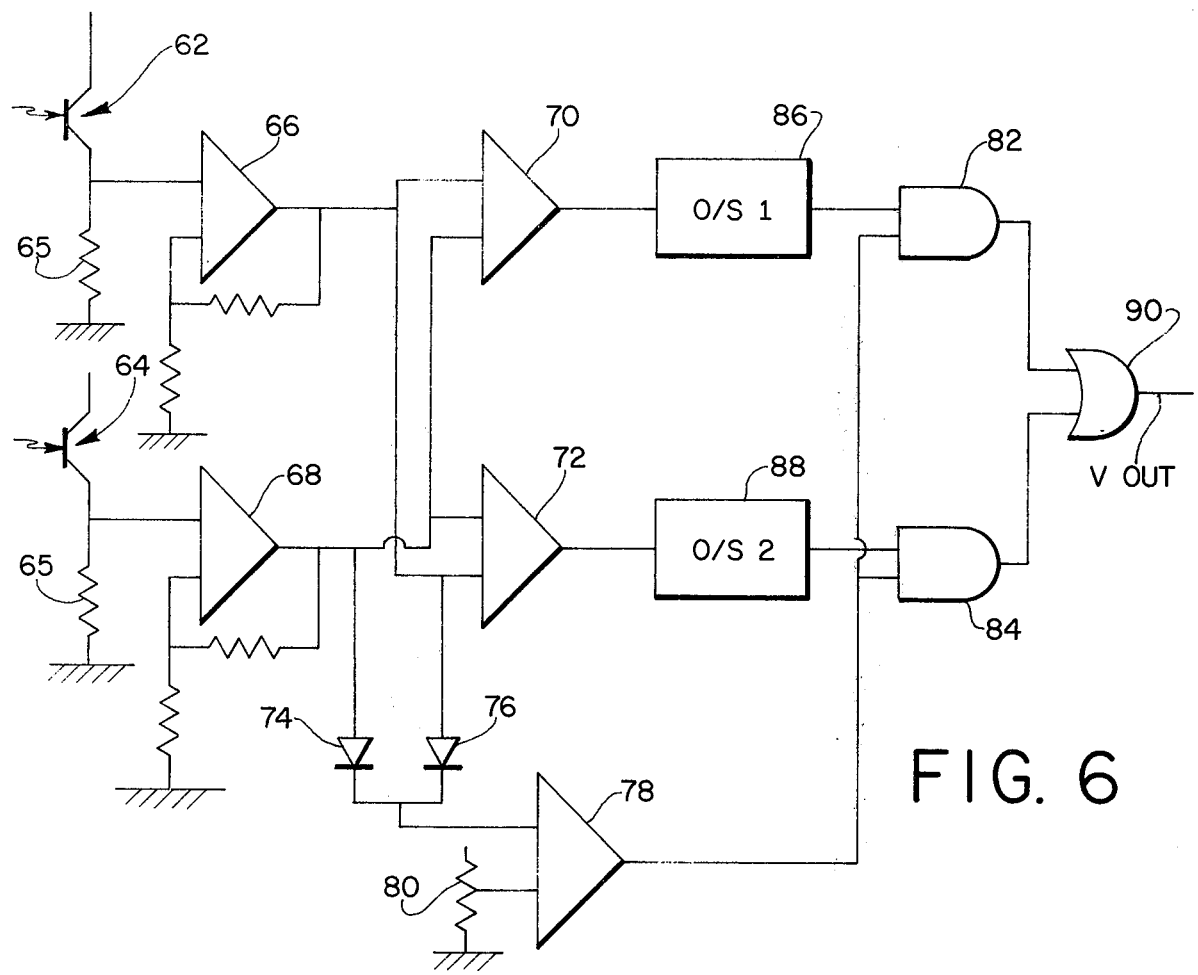
FIG. 6 is a schematic diagram of an electronic circuit for manipulating the control signals generated by one pair of photocells in the array of FIG. 4A to provide an output indication in coincidence with the alignment of such photocell pair in symmetrical relationship to the center line of the spinning station being sensed.

The occurrence of this intersection point between the output curves of each cell pair is detected electronically and one circuit designed for this purpose is illustrated in FIG. 6 for one given pair of photodetector cells. The basic requirement intended to be satisfied by this circuit is to detect the point at which the response curves of the two cells are in a condition of equality, provided that such point exceeds a certain reference voltage designated $V_{ref}$. This proviso is necessary since the response of the two cells can also be equal in the absence of any light impinging thereon and must be excluded to avoid a false indication.

In FIG. 6, the photodetector cells 62, 64 which can be photo-transistors are connected in a voltage mode to a source of DC current in series with a resistance 65. The output of each of the cells is transmitted to the input of a closed loop operational amplifier 66, 68, the gain of which is determined by the ratio of the resistances in the closed loop circuit. The function of closed loop amplifiers 66, 68 is both to amplify the voltage output of the corresponding phototransistor and to introduce a high input impedance to prevent attenuation of the voltage generated across the resistors 65, the effective resistance of which is selected to be small so as to keep the response time of the photo-transistors sufficiently fast to thus render the device independent of carriage speed. Each of the closed loop amplifiers 66, 68 has its output "cross-referenced" to the opposite inputs of two open loop operational amplifiers 70, 72, that is to say, the output from closed loop amplifier 66 is connected to the positive input of open loop amplifier 70 and to the negative input of open loop amplifier 72, while the output of closed loop amplifier 68 is connected to the positive input of amplifier 72 and the negative input of amplifier 70. Thus, the two open loop amplifiers, in effect, compare the amplified outputs of the two cells so that when the output of cell 62 is higher than cell 64, the output of the corresponding open loop amplifier 70 will be high and that of the other open loop amplifier 72 will be zero. Conversely, when the second cell 64 has an output higher than the first, the output of the corresponding open loop amplifier 72 will be high and that of amplifier 70 will be zero. Amplifiers 70, 72 are of the high-gain type, having a gain of approximately 20,000, and provide a maximum output voltage of, say, about 13 volts.

The reference voltage $V_{ref}$ mentioned above is derived by a voltage comparator circuit including a pair of diodes 74, 76, each of which receives the amplified output from one of the cells 62, 64 and together function in the manner of an OR gate following the amplified voltages from the cells and delivering an output voltage equal to the higher of the two. The output voltage from the diode pair is amplified in a further open loop operational amplifier 78, having its negative input connected to ground through a variable resistance 80 to allow for adjustment of the level of the reference voltage. The output voltage from the amplifier 78 is delivered to each of a pair of AND gates 82, 84 which also receive the output from one-shot multivibrators 86, 88 which respectively receive at their inputs the outputs from open loop amplifiers 70, 72. The outputs from the two AND gates 82, 84 are combined at OR gate 90 which gives an output voltage designated $V_{out}$.

Figure 7:
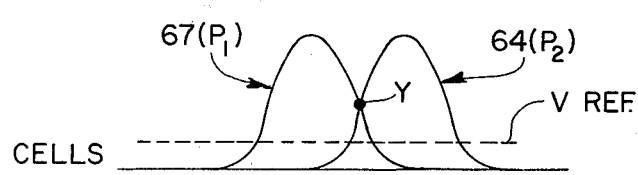
FIG. 7 is a voltage diagram of the output voltages of the principle components of the electronic circuit of FIG. 6 depicted in timed relationship.

The operation of the just-described circuit will be more fully understood in relation to a voltage diagram in FIG. 7 comparing the response of the principal components of the aforegoing circuit. At the top line of this diagram, the response curves for the cells is shown, assuming the cells to be moving in the direction indicated by the arrow. The spacing of the curves is such that they intersect at a single point, which is designated Y. The reference voltage $V_{ref}$ is indicated by the horizontal dashed line which can have a quantitative value of, say, about 2 volts.

Amplifier 78 compares the higher of the amplified outputs of either of the cells 62, 64 to the reference voltage $V_{ref}$, hence, when the output from either cell exceeds $V_{ref}$, the output of the amplifier 78 becomes high, as indicated by the second line of FIG. 7. Amplifier 70, represented by the third line, becomes high when the amplified input voltage from cell 62 exceeds the amplified input voltage of cell 64 and drops to zero when the opposite condition occurs coincidentally with point Y. Amplifier 72, of course, behaves conversely to amplifier 70, becoming high when the amplified output voltage from cell 64 exceeds that of cell 62, also coincidentally with point Y and stays high until the response of the cell returns to zero, as appears in the next line.

The one-shot multivibrators are adapted to trigger on a positive going pulse only and are selected to give an output pulse of a width which is small compared to the period during which the comparator amplifier 78 remains high. Thus, vibrator 86 gives a pulse immediately when amplifier 70 goes high, while the other vibrator 88 gives a pulse immediately when amplifier 72 goes high, as depicted in the fifth and sixth lines of FIG. 7. By combining the output pulses of the two multivibrators 86, 88 with the output voltage of the comparator amplifier 78 through AND gates 82, 84 and OR gate 90, one obtains a final output voltage, $V_{out}$, at a point satisfying the initially imposed condition, i.e., when the amplified voltages from the two cells have achieved equality at a level in excess of $V_{ref}$, which coincides with point Y.

The just-described circuit will obviously operate with equal effectiveness if the direction of travel of the cells is reversed from that indicated by the arrow in FIG. 7 and, moreover, will be independent of the relative levels of the starting voltage of the two photoconductors. Given possible different characteristics in otherwise identical detectors and possible different ambient conditions therefor, the starting voltage of either of the cells could be higher than the other. Since, however, any initial variation in the relative voltage levels of the two detectors occurs outside of the period during which the comparator amplifier 78 is high, changes in such levels have no effect on the desired output of the circuit.

Figure 11:
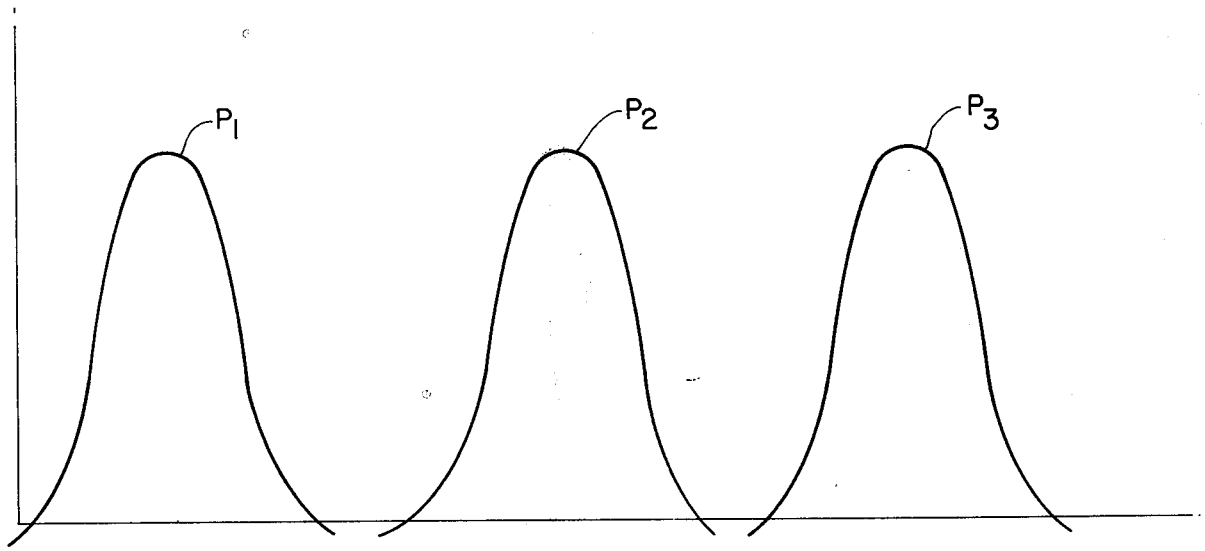
FIG. 11 is a set of output curves similar to FIG. 8 for the modified array of FIG. 4B.

In a modified and less preferred embodiment of the invention, a single photodetector cell is utilized to provide an indication of the occurrence of a position in registration, either transistory or stationary, with the center line of a spindle position, instead of paired cells as in the preferred embodiment. Desirably, three of such cells are combined into an array, mentioned previously in connection with FIG. 4B, and the response curves for the cells in this array would in practice follow relative patterns as depicted in FIG. 11 for the three cells $P'_1$, $P'_2$ and $P'_3$. In this embodiment, it is assumed that the output of each photocell is a differentiable function with a single maximum such that dV/dt in the region proximate the maximum is high, an assumption which obviously fits the response curves depicted in FIG. 11. Under such circumstances, it becomes possible to detect the occurrence of the single maximum, i.e., the peak of the response curve, and such detection furnishes an indication of the arrival of the cell in question in registration with the center line of the given spinning station.

Figure 9:
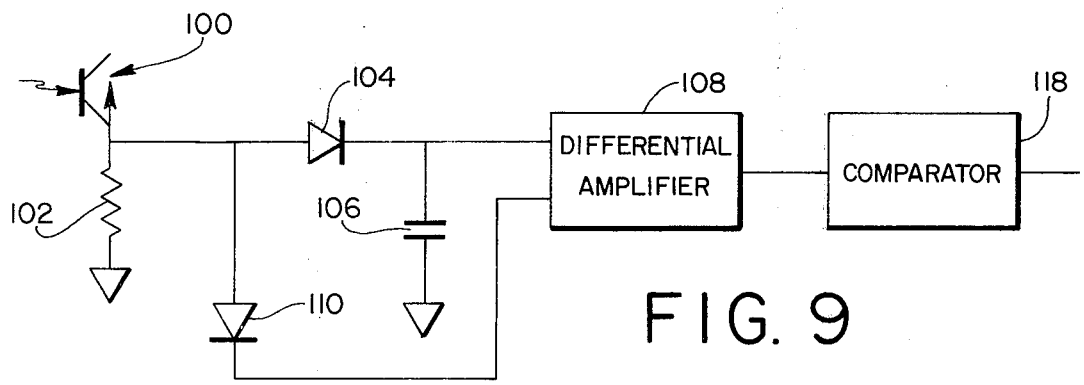
FIG. 9 is a simplified electrical circuit for manipulating the output of one cell of the modified array of FIG. 4B to measure the peak response of that cell.

A simple form of electronic circuit for detecting the occurrence of a peak in a voltage is depicted in FIG. 9 and involves delivering the output from the photodetector, designated 100, again connected in the voltage mode with resistance 102, through a diode 104 to a capacitor 106 and then through a differential amplifier 108. The output from detector 100 is also delivered, for purposes of comparison, through a separate diode 110 to the differential amplifier 108. And the output from differential amplifier 108 is delivered to a comparator 112.

Figure 10:
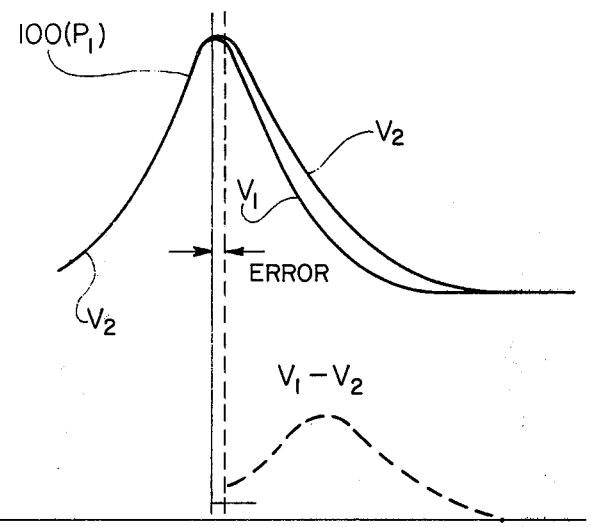
FIG. 10 is a voltage diagram illustrating the operation of the circuit of FIG. 9.

The operation of the just-described circuit is depicted graphically in FIG. 10 wherein the top line $V_2$ represents the voltage input received at the input of differential amplifier 108 in circuit with capacitor 106 while the curve $V_1$ represents the voltage received directly from the other input of the differential amplifier. So long as the voltage is increasing, the two levels move in unison. However, as soon as the input voltage begins to decrease, $V_2$ follows the change at a slower rate than does $V_1$ because of the effect of capacitor 106. Thus, a difference is introduced between $V_1$ and $V_2$ which is amplified by differential amplifier 108 giving an output corresponding to the curve at the bottom of FIG. 10. Comparator 112 functions to determine when this voltage difference ($V_2-V_1$) exceeds a preset level and to provide an indication that such a condition has occurred. Obviously, some finite period of time must pass for the voltage difference to be manifested at the differential amplifier 108 and, consequently, this approach is subject to some error, as indicated in FIG. 10. However, this error can be made rather small and is, moreover, subject to predetermination and can thus be readily compensated for.

Figure 12:
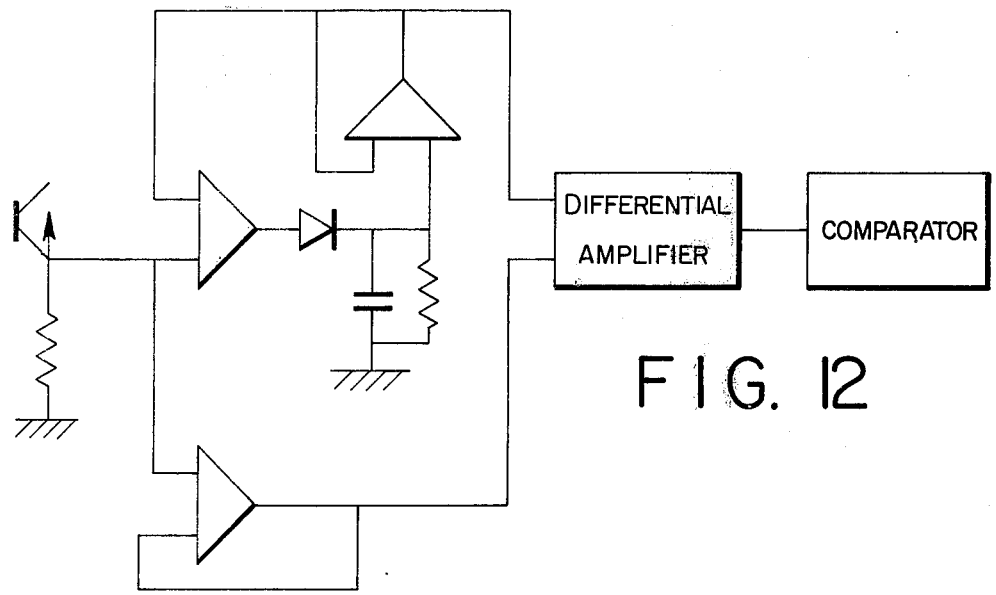
FIG. 12 is a modified form of electrical circuit for accomplishing the same result as the circuit of FIG. 9.

A more practical form of the circuit of FIG. 9 is presented in FIG. 12 wherein the effects of voltage drops across diodes is avoided by replacing the diodes with operational amplifiers. It will be appreciated that, as is true of FIG. 6, each of the circuits of FIGS. 9 and 12 is associated with a single sensing stage and would have to be triplicated for the three stage array of both embodiments so as to provide an indication of the occurrence of registration for each such stage.

In the introduction to this specification, reference is made to the potential utility for a variety of different purposes in conjunction with automatic servicing equipment of the type in question of the registration indication provided by the optical sensing unit of the present invention. A particularly preferred utility, however, is for the purpose of controlling the arresting motion of the servicing carriage in accordance with a particular predetermined sequence. This sequence is represented diagrammatically in FIG. 13 and will now be explained by reference to that figure in conjunction with FIG. 1. During operation, the tender T is moving on the rails 26 along the row of spinning positions S at a given patrolling speed under the motive power of motor M. The motor control unit MC for motor M is capable of regulating the speed of the motor at at least three different speed levels and the normal patrolling speed is preferably selected at the highest of these speeds in order that the tender might cover as many spinning stations as possible en route to a particular station requiring servicing.

For present purposes, a condition at a particular spinning station requiring servicing is considered to be "an abnormal condition" and, when the tender does encounter a spinning station in an abnormal condition, a signal is produced to activate the carriage positioning control system including the unit MC which receives a signal and proceeds to de-energize driving motor M. The instrumentalities needed to observe the operating condition of the various spindle positions being traversed form no essential part of the present invention and, as the details thereof have all been described extensively in the commonly assigned patents identified above, reference may be had to those disclosures for an understanding thereof without the necessity for repetition here.

After the motor has been de-energized, the inertia of the carriage will carry it past the spinning station at which the abnormal condition requiring servicing exists so that it is necessary to "back up" the carriage into proper servicing alignment with that spinning station. To avoid damage to the motor which is connected to the driving shaft of the carriage by a timing belt, it is desirable to insure that the motor is stopped, or at least slowed to an appropriate level, before the driving direction of the motor is reversed. This result could be accomplished by providing a time delay in the motor control which would be effective to reverse the motor direction only after the passage of a sufficient time insuring that the speed of the motor has slowed to a point where reversal can be accomplished safely. However, a more efficient approach from the standpoint of the saving of time is to include a tachometer K which follows the speed of the motor and gives an indication when the motor has come to a stop or at least slowed sufficiently. Upon the giving of such an indication by the tachometer, the direction of the motor is reversed and the carriage begins to move in the opposite or back-up direction.

While the original high driving speed could be maintained in the reverse direction, it is preferred to switch the motor via the motor control MC to a lessor or "medium" speed since the carriage will have come to a stop in the general vicinity of the spinning station requiring servicing and thus would have little opportunity to actually reach its initial high speed before returning to the spinning station. Thus, the tachometer indication of zero speed is preferably also effective to switch the motor controlled to program medium speed for the motor. Tachometer K is also used as part of the motor controller MC to regulate the speed of the motor M. As an example, a suitable high speed might be 18–36 inches/sec. while a suitable medium speed might be 4–8 inches/sec. The carriage is now backing up toward the spinning station requiring servicing at medium speed and, if the design of the apparatus is such that the carriage cannot be brought to a stop initially within the interval between the station requiring servicing and the next proximate station, but instead passes one or more subsequent station, it will obviously be necessary to provide control means capable of determining the number of stations passed in coming to a stop and preventing the arrest of the carriage during its back up phase until the proper station has been reached. This might be done by counting the number of stations so passed and then "uncounting" during the reverse travel of the carriage.

It will be recalled from the previous description that three sensing or detecting stations are provided, either in the form of paired sets of detector cells or individual detector cells, with the stations arranged in predetermined spaced relationship within the sensing unit in relation to the direction of travel of the carriage and the purpose for this multiplication of stages will now become clear. In brief, the first such sensing station serves to observe when the reversely moving carriage approaches proximity to the station requiring servicing; it is, therefore, arranged in "leading" relation to the next station at a distance sufficient for this purpose which can be as small at ¼ inch. When the circuit for this station, which can be constituted by any of the electrical circuits described above, provides an output indication, that indication is transmitted to the motor controller to immediately reduce the speed of the carriage to a minimum level, say ½–1 inch/sec.

The carriage is now creeping backwardly towards the abnormal station and momentarily the next or intermediate station will move into registration with that position and the output indication provided by the circuit for that station transmits a signal which is effective to both stop, i.e., de-energize, the motor M and apply the carriage brake B to rapidly arrest the movement of the carriage.

The design of the apparatus of the invention with all of its components is so determined as to normally permit the carriage to be fully arrested with the manipulative instrumentalities carried thereon to perform the servicing function on the given station within the tolerable limits of alignment relative to that station. However, since serious damage to the machine can result if the manipulative operations are attempted to be performed with the carriage outside the permissible limits of alignment, it is virtually indispensable as a safety factor to provide a means of determining when the permissible limit has been exceeded. This function is supplied by the third sensing station which is located in sufficiently spaced "trailing" relation to the second or intermediate station as to coincide with the maximum possible limit. Thus, the second and third stations define the permissible limits of alignment. One must obviously insure that the carriage has, in fact, been arrested before an effective observation is made by the second and third stations and, consequently, the tachometer is again restored to provide an indication that the motor is in a stopped condition and, when this indication is received, the second and third stations are "interrogated" to determine if an output signal has been generated thereby.

If the carriage has been successfully positioned within the permissible limits defined by the second and third stages, the manipulative operations needed for servicing the position are then commenced in the manner disclosed in the various commonly assigned patents already identified to which reference may be had for details. The successful completion of these operations is then confirmed by an observation of the presence of running yarn at that station, and means to this end form a part of the systems of such prior patents, following which the motor is again reversed in direction, to return the carriage to its original patrol direction, and programmed for patrolling at the original high speed.

Figure 13:
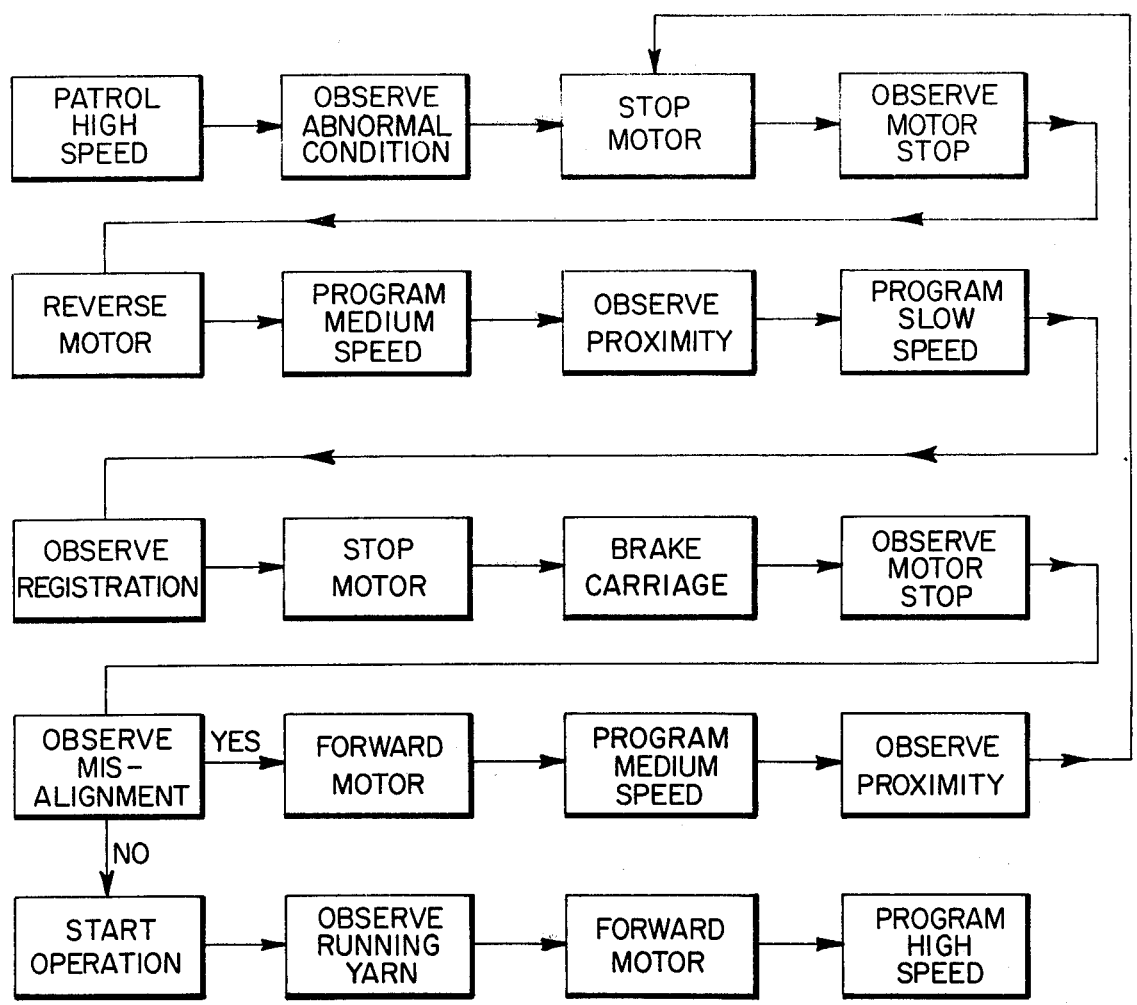
FIG. 13 is a step-by-step diagram of the sequence of operations for controlling the operation of the servicing carriage in accordance with a preferred embodiment of the invention.

If, on the other hand, the carriage in coming to a stop has in fact overridden the intended station to an unacceptable extent so as to intrude upon what can be referred to as a "crash zone," i.e., that region at which the manipulative instrumentalities on the carriage would crash with the spinning station components, this condition would be indicated by the generation of an output signal from the circuit for the final sensing station (represented symbolically by the word "yes" in the diagram of FIG. 13), and this signal is employed to, in effect, "instruct" the carriage to make a second attempt at achieving proper registration with the station needing attention. This is done by again reversing the motor direction, causing the carriage to be driven forward, until it is clear of the active spinning station and thus in position to make a further attempt. The distance of travel of the carriage in the forward mode is quite short and any speed selection by the "forward" signal is appropriate. Medium speed is a good compromise at this stage.

The carriage proceeds in the forward direction until the initially leading sensing station, which is now in trailing relation, generates a signal indicating that the optical sensing unit has fully cleared the given spinning station. This signal is transmitted to the motor control MC to stop the motor and, in effect, recycle the carriage operating sequence to the stage existing immediately after the initial observation of the abnormal condition, as indicated in FIG. 13. All of the steps in the alignment sequence are thus repeated through the observation by the final sensing station as to the occurrence of misalignment. Presumably, since the distances travelled during the second attempt at alignment are considerably less than those initially involved, the second attempt will be successful and the manipulative instrumentalities carried on the operation can proceed to perform their servicing functions. If the second attempt is again unsuccessful, further attempts can be made if desired or, alternatively, the carriage can be programmed to terminate further operations and provide a signal, such as a flashing red light or other visible, and/or audible alarm that a malfunction has taken place beyond the capacity of the unit to rectify so as to attract the attention of a human observer.

It will be appreciated that the above-explained sequence of operations is readily adaptable to the needs of a variety of spinning frames and can be readily adjusted to meet the requirements of different gauges of spinning machines which normally have their spinning stations spaced apart from three to 5 inches from center-to-center, a typical gauge in the U.S. being 3.5 inches. The operating speed for the motor at the various indicated stages could, of course, be varied from the levels stated above so that, for example, the speed of the motor in the reversal mode could decrease in an additional number of stages which might be especially desirable if the carriage were operated at a sufficiently high normal patrolling speed as to cause it to "overshoot" a plurality of stations during its initial braking phase since, in this case, it would be desirable to accelerate the motor initially in the reversal mode in order to reduce the amount of time required to return the carriage to the spinning station requiring attention. Other modifications and variations than those expressly acknowledged throughout this description are, of course, possible within the spirit of this invention.

What is claimed is:

1. In an automatic multi-station strand processing machine equipped with a motor-driven traveling tender carriage capable of detecting the existence of an abnormal condition at a processing station in the machine and servicing the station to restore it to normal operation, an improved control arrangement for arresting said carriage in operative alignment with said station which comprises means responsive to the detection of an abnormal condition at a given station to arrest the travel of the carriage at a point past the center line of said station and then reverse the driving direction of the carriage motor, a plurality of sensing stages on said carriage disposed in fixed spaced relation in the direction of carriage travel and adapted to sense individually the passage thereof into registration with the center line of said station and to generate a corresponding output signal, means for arresting the reverse travel of said carriage responsive to a signal from a first sensing stage, and means operative when said carriage is arrested for observing signals from the first sensing stage and a second stage spaced downstream relative to the reverse direction of carriage travel of said first stage to indicate misalignment of the carriage with respect to said station center line.

2. Apparatus as set forth in claim 1 including a further sensing station arranged in leading relation to said two stations to observe the arrival of the reversely traveling carriage into proximity with the station to be serviced and to prepare the carriage to be arrested.

3. Apparatus as set forth in claim 2 wherein said further sensing station reduces the driving speed of the carriage preparatory to its arrest.

4. Apparatus as set forth in claim 2 wherein a one of said stages is operative to record the number of further stations passed in bringing the carriage to a stop thereby preventing the arrest of said carriage during its backup phase until said carriage reaches its proper station.

5. Apparatus as set forth in claim 1 including means responsive to said signals from said first and second sensing stages indicating misalignment to operate said carriage to make a further attempt to arrest the carriage in operative alignment with said station centerline.

6. Apparatus as set forth in claim 1 including means for terminating the operation of said carriage motor after a predetermined number of attempts by said carriage to position in alignment with said station centerline.

7. Apparatus as set forth in claim 6 including means for providing a signal to indicate that the carriage has failed to assume a condition of registration with said centerline after said predetermined number of attempts.

* * * * *